United States Patent
McComb et al.

(10) Patent No.: US 9,933,158 B2
(45) Date of Patent: Apr. 3, 2018

(54) UNDERWATER TORCH

(71) Applicant: Broco, Inc., Rancho Cucamonga, CA (US)

(72) Inventors: David Dean McComb, Highland, CA (US); George Ray Hirvela, Riverside, CA (US)

(73) Assignee: Broco, Inc., Ontario (CA)

( * ) Notice: Subject to any disclaimer, the term of this patent is extended or adjusted under 35 U.S.C. 154(b) by 590 days.

(21) Appl. No.: 13/741,270

(22) Filed: Jan. 14, 2013

(65) Prior Publication Data

US 2013/0196274 A1  Aug. 1, 2013

Related U.S. Application Data

(60) Provisional application No. 61/586,610, filed on Jan. 13, 2012.

(51) Int. Cl.
| | |
|---|---|
| *F23D 14/44* | (2006.01) |
| *B23K 7/10* | (2006.01) |
| *B23K 9/00* | (2006.01) |
| *B23K 9/013* | (2006.01) |

(52) U.S. Cl.
CPC ............. *F23D 14/44* (2013.01); *B23K 7/10* (2013.01); *B23K 9/0061* (2013.01); *B23K 9/013* (2013.01)

(58) Field of Classification Search
CPC .......... F23D 14/38; F23D 14/44; F23D 14/42; B23K 9/0061; B23K 9/013; B23K 7/10
USPC ......... 266/48, 49, 74; 219/70, 75, 74, 137.1, 219/137.31, 138, 139, 136, 144; 431/158, 431/353; 137/614.2
See application file for complete search history.

(56) References Cited

U.S. PATENT DOCUMENTS

| | | | | |
|---|---|---|---|---|
| 2,549,360 A * | 4/1951 | Barbeck | ........................ | 219/70 |
| 3,751,625 A * | 8/1973 | Hummel | .............. | B23K 9/0061 |
| | | | | 219/144 |
| 4,361,746 A * | 11/1982 | Johnson | ............... | B23K 9/0061 |
| | | | | 219/136 |
| 5,407,348 A * | 4/1995 | Mims | ...................... | F23D 14/42 |
| | | | | 137/454.2 |
| 5,769,119 A * | 6/1998 | Edenfield | ................ | F16K 15/18 |
| | | | | 137/614.2 |
| 8,375,697 B2 * | 2/2013 | Valentian | ................... | 60/39.826 |

\* cited by examiner

*Primary Examiner* — Scott Kastler
*Assistant Examiner* — Michael Aboagye
(74) *Attorney, Agent, or Firm* — Knobbe, Martens, Olson & Bear LLP

(57) ABSTRACT

A underwater cutting torch having a control valve assembly, a check valve assembly and a torch head all positioned within a housing. The control valve assembly and check valve assembly include a passageway for gasses to flow that includes a coupler formed of PTFE material to inhibit combustion within the handle of the underwater cutting torch.

36 Claims, 5 Drawing Sheets

UNDERWATER TORCH

CROSS-REFERENCE TO RELATED APPLICATIONS

This application claims the benefit of U.S. Provisional Patent Application No. 61/586,610 filed Jan. 13, 2012 entitled Underwater Cutting Torch which is hereby incorporated by reference in its entirety herein.

BACKGROUND OF THE INVENTION

Field of the Invention

The present invention relates to underwater torches and, in particular, underwater torches used for cutting metals and other objects and materials.

Description of the Related Art

Underwater construction and maintenance occur in a wide variety of different applications, including the development of off-shore oil fields and other water applications. This type of construction often requires the use of welding equipment and cutting equipment that is capable of providing high heat in underwater environments.

One method of providing such high heat in cutting operations is to use an arc based torch that provides electric current to a handle assembly that can be used to produce an arc that can ignite a cutting rod. Typically, the torch is also provided with an oxygen source so that the cutting rod continues to burn once ignited by the electrical arc. Thus the torch is providing both oxygen and electrical current into a device held in a diver's hand.

The operation of such torches in an underwater environment creates various risk factors that have to be addressed by the torch manufacturer. The combination of oxygen, high heat, large electrical currents to create the arc, and the underwater environment, which is often a salt water environment, give rise to possible fire, explosion, and electric shock issues for the diver using the torch. One example of these kinds of problems that torch manufacturers must contend with is that the burning material may flashback into the handle of the torch causing the torch body itself to ignite in the diver's hand. Another example of the problems that torch manufacturers have to contend with is the risk of the insulation materials weakening, potentially exposing the diver to the electrical current being used to produce the arc.

With some prior art torches, wear and tear of the torch may increase the possibility of the torch catching fire and damaging the torch with an increased potential risk of injury to the diver.

Further, the wear and tear issues are often enhanced by electrolysis that can occur in salt water environments. More specifically, the torch has portions that are electrically charged and the material being cut is oppositely charged which can result in electrolysis paths forming which can degrade or damage the metal parts of the torch which enhance the leakage risks associated with the torch.

Consequently, there is a continuing need to develop torches for underwater welding and cutting operations that are safer and less prone to damage due to the environment in which the torches are used.

SUMMARY OF THE INVENTION

The aforementioned needs are addressed by a torch of the present invention which, in one exemplary embodiment, comprises a housing that has a handle and a nozzle wherein the interior of the housing defines a passageway for gasses to flow, a valve lever attached to the housing having a first position and a second position, a valve coupled to the valve lever wherein the valve is open when the valve lever is in the first position allowing gasses to flow through a passageway in the housing and wherein gasses are inhibited from flowing when the lever is in the second position and a non-return valve coupled to the housing so as to inhibit flow of hot gasses from passing through the nozzle end into the torch in the event of a flash back or other anomaly.

In one implementation, the housing has a control valve assembly that includes the valve and valve lever and a torch head that receives a cutting or welding rod. The control valve assembly and torch head are electrically isolated from each other and the torch head receives both electrical current and oxygen to produce an arc and ignite a cutting rod attached to the torch head.

In one implementation, a portion of the passageway through which oxygen is transmitted from the control valve assembly to the torch head is formed of an electrically insulating material that is also a substantially non-combustible material that, when ignited, will not produce sufficient heat to continue to burn in the presence of an oxygen flow. In one specific implementation, the electrically insulating material is formed of a polytetrafluoroethylene (PTFE) material such as the material sold under the trademark Teflon by DuPont Co. In one implementation, the electrically insulating portion is surrounded by a sheath of reinforcing material that inhibits leaks forming in the gas pathway, that is also formed of a material that is resistant to burning. In one example, the sheath of reinforcing material is formed of fiberglass mesh that does not produce a significant carbon layer when burned and thereby reduces the risk of conductive paths forming between the control valve assembly and the torch head.

In another implementation, the lever that is coupled to the control valve member is positively connected to the valve piston so that the lever can both open and close the valve to inhibit the valve from getting stuck into an open position by debris.

In another implementation, the valve member is positioned within a valve body such that a valve seal, formed of a substantially non-combustible material such as PTFE, inhibits the flow of oxygen through the passageway when the valve is in the closed position. The valve member is further contoured so that even if the valve seal is burned away, the valve member continues to provide at least some sealing against the valve body to reduce or prevent the flow of gas through the passageway.

In another implementation, the torch head includes a non-return valve that is only open when oxygen is flowing to inhibit combusting gases from returning into the torch body. The non-return valve can also include a valve having a valve seal formed of a substantially non-combustible material like PTFE and can also be further contoured so that even if the valve seal is burned away the valve member can continue to provide at least some sealing.

In another implementation, the torch head includes a ceramic or flash arrester washer that defines an opening that forms a portion of the passageway through which gas is delivered through the torch to the rod. The ceramic or flash arrester washer is preferably positioned adjacent the collet location where fuel rods are positioned. The flash arrester washer, in one implementation, is formed of a ceramic material so as to inhibit burning of the flash arrester washer. A flexible washer may be positioned outward of the fuel rod positioned within an opening defined by the flash arrester washer so that the flexible washer seals the fuel rod in the collet but the flexible washer is not in the oxygen passageway and is therefore less susceptible to burning. Thus, the flexible washer can be made of silicon rubber or neoprene.

In another implementation, an outer housing formed of an insulating material, such as plastic, is positioned about the torch head and the check valve body. In one implementation, the outer housing is formed of two halves and has a gasket material with at least one raised gasket surface to seal the torch head and the check valve body. The outer housing may be comprised of a plastic material with a rubber insert and may also include a flexible insulator.

These improvements reduce the dangers associated with combustion occurring within the torch body and also the dangers of electrical current travelling through the torch body, causing electrolysis damaging the torch or contacting the diver's hand. These and other objects and advantages will become more apparent from the following description taken in conjunction with the accompanying drawings.

DETAILED DESCRIPTION OF THE PREFERRED EMBODIMENT

Figure 1:
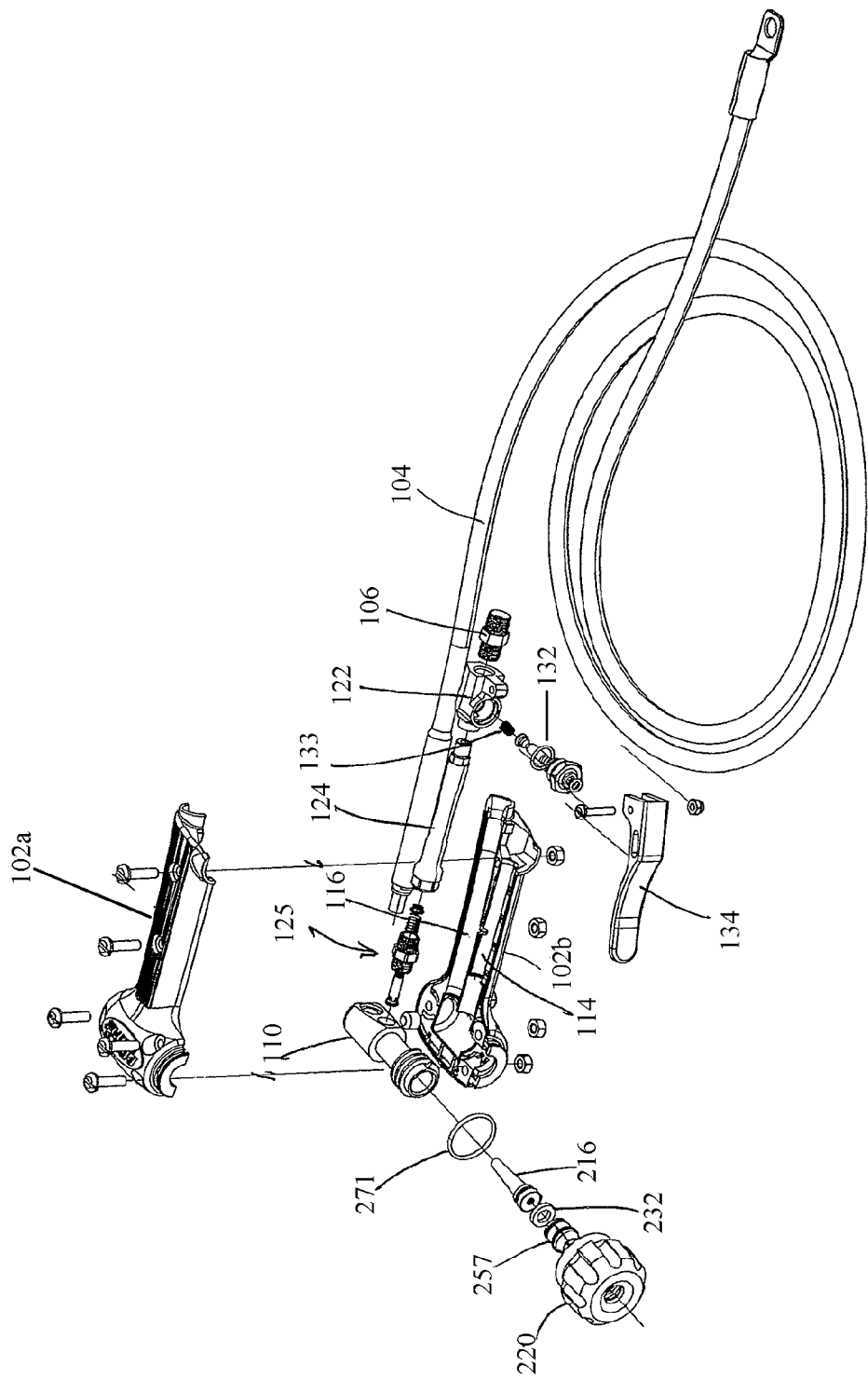
FIG. 1 is an exploded perspective view of the components of one embodiment of an underwater torch of the present invention.
Figure 2:
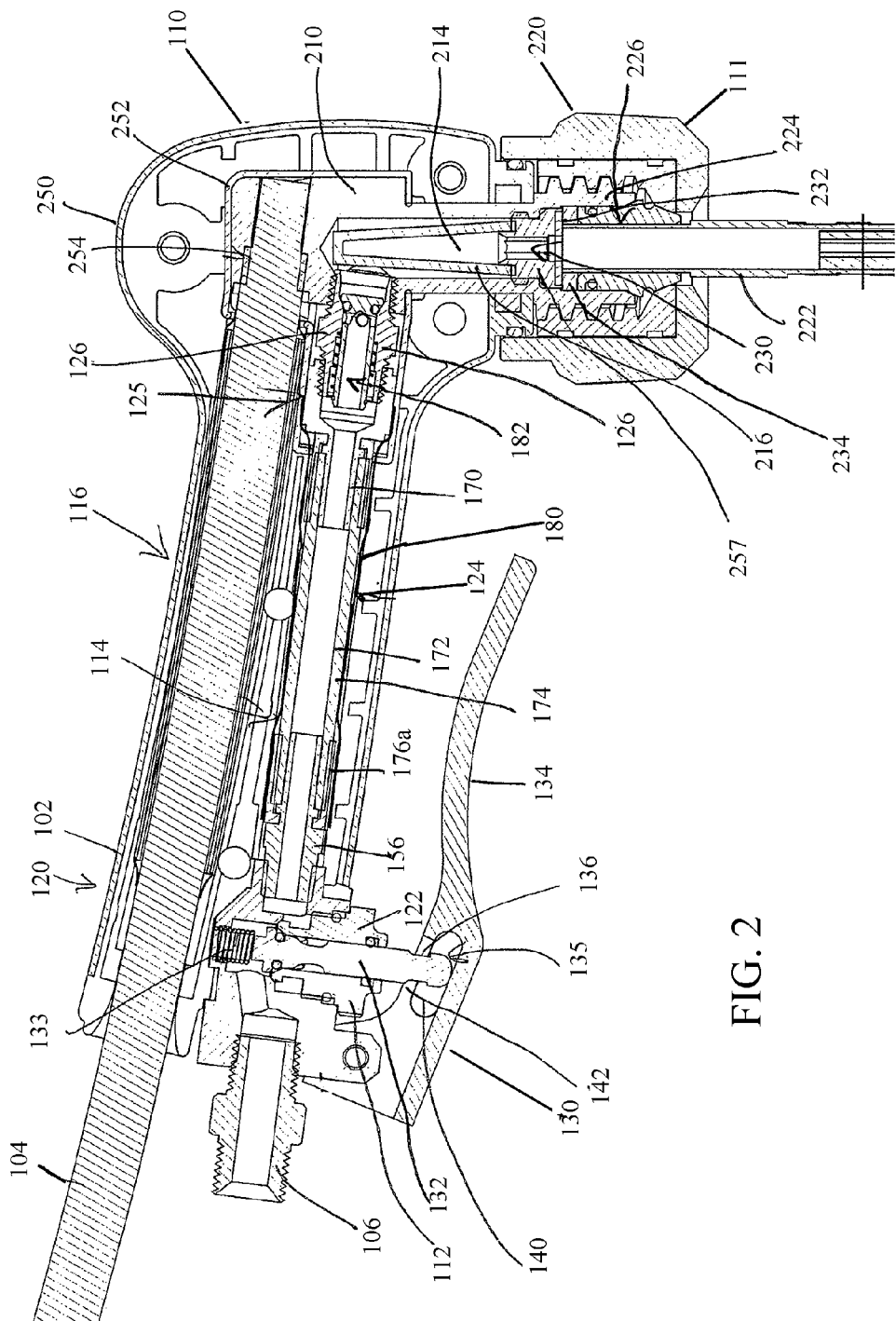
FIG. 2 is a cross-sectional view of the underwater torch of FIG. 1.

Reference will now be made to the drawings wherein like numerals refer to like parts throughout. Referring initially to FIGS. 1 and 2, an underwater torch 100, such as a cutting torch, will now be described. The torch 100 defines a housing 102 formed of two pieces 102a, 102b that are bolted together that is sized to be held within the hand of a diver and used for underwater cutting or welding operations. The torch housing 102 receives an electrical wire 104 that delivers current that is suitable for creating an arc underwater. In one implementation, the electrical wire 104 is sized to provide currents in excess of 150 Amps. The torch housing 102 also includes a fitting 106 that is connected to a gas hose such that oxidizing gas, such as oxygen, can be delivered to the torch housing 102.

Inside the housing 102, the main components of the torch 100 include a torch head 110 with a nozzle 111 and a control valve assembly 130. The torch housing 102 with a nozzle 111 defines a handle portion and a head portion and is formed of an electrically insulating material and is also water resistant as will be described in greater detail below. The torch housing 102 preferably defines a gas passageway 114 through which oxidizing gases are delivered to the torch head 110 and a current wire passageway 116 through which the wire 104 delivering the arc current is delivered to the torch head 110. Preferably, the passageways 114 and 116 are electrically insulated from each other.

More specifically, as shown in FIG. 2, the current wire 104 is positioned in the passageway 116 so as to extend in a first, horizontal direction in a first portion 120 of the housing 102 and connects to the torch head 110 that is formed of a conductive material such as bronze or brass. The first portion 120 corresponds to the handle of the torch 100. The gas passageway 114 is also formed through a control valve body 122, an insulating coupler hose 124 and a check or non-return valve body 122 of the torch head 110. As will be described in greater detail below, delivery of gas through the passageway 114 is controlled via the valve assembly 130 and flows through a check valve in a check valve assembly 125. As will be described in greater detail below, the insulating coupler hose 124 is preferably formed of a material that electrically insulates the torch head 110 from the control valve body 122 so that the control valve body 122 is inhibited from being electrically charged to thereby protect the diver operating the control valve.

The control valve assembly 130 that incorporates the control valve body 122 that allows a diver to control the flow of gas to the torch head 110 will now be described in reference to FIGS. 1, 2 and 3A. As shown, the control valve assembly 130 includes the control valve nut 277 that defines an opening 127 that receives a piston 132. The piston 132 travels in a direction that is perpendicular to the direction of travel of the gas through the passageway 114. The piston 132 is preferably tapered such that when the piston 132 is pushed sufficiently out of the opening 127, gas can flow from a source fitting 106 to a receiving tube 156 via the opening 127.

The piston 132 is coupled with a pivoting lever 134 that defines a hollow space 140 that receives an end 135 of the piston 132. By depressing the lever 134, the piston 132 is raised sufficiently to permit the gas to flow from the source fitting 106 to the receiving tube 156 via the opening 127. The piston 132 is also spring loaded by a spring 133 so as to be biased in a closed or sealed position.

Figure 3A:
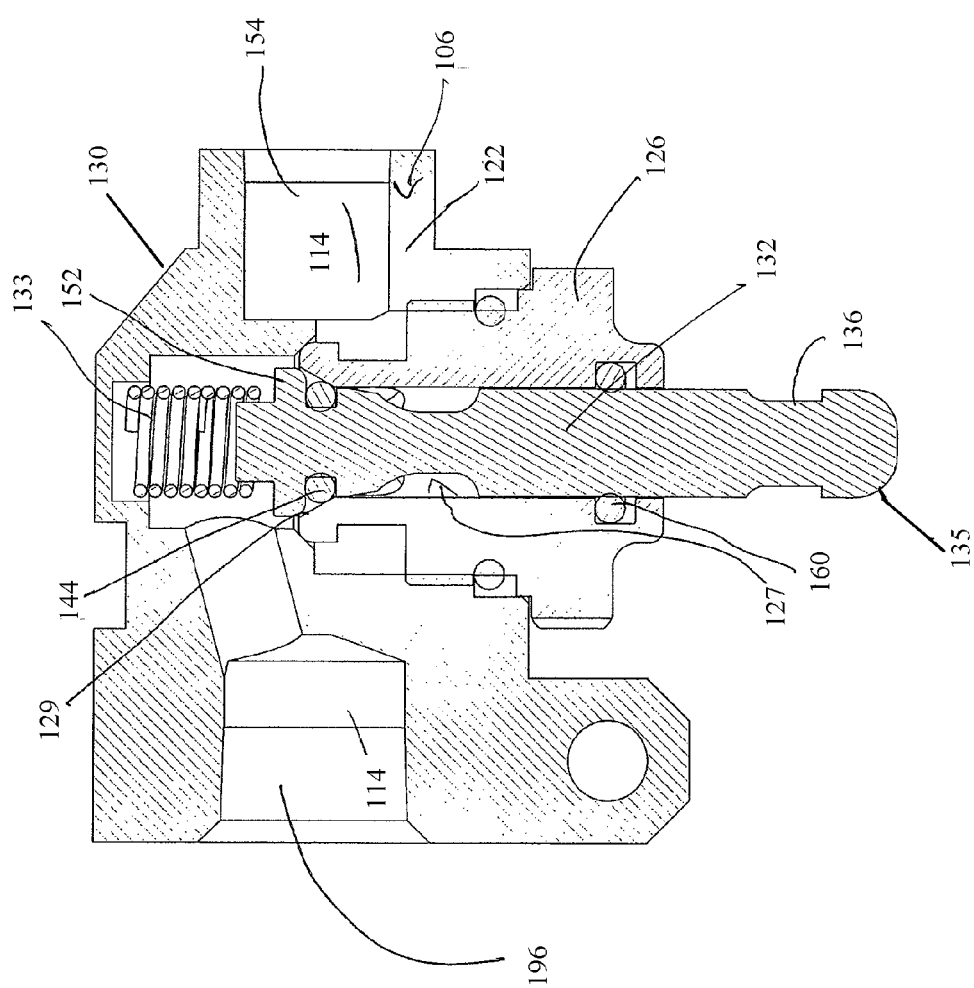
FIGS. 3A-3C are detailed cross-sectional views of various sections of the underwater torch of FIG. 1.

As shown in FIGS. 2 and 3A, a circumferential or ring seal 144, which in one embodiment comprises an O-ring made of a substantially non-combustible material such as PTFE, is positioned about the piston 132 at a location where the seal 144 prevents gas from flowing through the opening 127 when the piston 132 is in a closed position. However, as shown in FIG. 3A, the inner walls 129 of the opening 127 are tapered and an upper portion 152 of the piston 132 is contoured so that even if the seal 144 is damaged or burned, the upper portion 152 of the piston 132 mates with the inner wall of the opening 127 to inhibit or possibly prevent the gas from flowing.

The seal 144 is preferably made of PTFE which the Applicant has demonstrated can be ignited by an external ignition source, but once the ignition source is removed will generally not produce sufficient heat to continue to burn even in the presence of an oxygen flow in the range of 8-20 CFM. Hence, the seal is substantially non-combustible and provides a safer material to use in the torch 100 as the material will be less likely to result in the torch 100 developing combustion within the housing 102.

As is also shown, in FIG. 2, a lower end 135 of the piston 132 is positioned within the hollow space 140 of the lever 134. The hollow space 140 is surrounded by a lip 142 that is dimensioned so as to engage with a notch 136 in the piston 132. This engagement permits the lever 134 to be used to forcibly move the piston 132 from the open position to the closed position and reduces the tendency of the control valve assembly 130 to be stuck in an open position and continuing to allow the gas to flow to the torch head 110.

As is also shown, the control valve nut 277 includes an o-ring or seal 160 that is positioned interior to the control valve body 122. The seal 160 inhibits leaking of the gas adjacent the piston 132 from leaking and, by positioning the seal 160 within the control valve nut 126 as opposed to attached to and moving with the piston 132, the likelihood of particles or foreign objects jamming the control valve assembly 130 into an open position is reduced.

Referring now to FIGS. 1 and 2, the coupler hose 124 will be described in greater detail. As shown, the coupler hose 124 extends between the receiving tube 156 of the control valve body 122 and a receiving tube 170 of the check valve 126. The coupler 124 is preferably made of an electrically non-conductive material so as to electrically isolate the control valve assembly 130 and the lever 134 held by the diver from the torch head 110 that is receiving the current from the wire 104. As the gas is travelling through the coupler 124, there is a risk of combustion extending into the coupler 124 which can increase the risk of the torch 100 internally combusting.

To address this risk, the Applicant has formed an inner tube 172 from a substantially non-combustible material such as PTFE described above. This reduces the risk of the coupler combusting internally to the housing 102 of the torch 100. In one embodiment, a PTFE tube of approximately 0.035" thickness is used and to reinforce the PTFE tube, reinforcing fibers 174 surround the PTFE tube to inhibit leakage of the gas. The reinforcing fibers 174 are preferably constructed of a material that does not create a significant carbon surface when burned so as to further inhibit the development of an electrical pathway from the torch head 110 to the control valve assembly 130 in the event of combustion occurring internal to the housing 102. In one implementation, the reinforcing fibers 174 are made out of fiberglass reinforced fibers.

As is shown in FIG. 2, the receiving tube 156 of the control valve body 122 has a compression fitting 176a that is positioned over the receiving tube 156 with the inner tube 172 and the reinforcing hose 174 interposed between the compression fitting 176a and the outer surface of the receiving tube 156. Similarly, the receiving tube 170 of the check valve body 126 also has a compression fitting 176b with the inner tube 172 and the reinforcing hose 174 interposed therebetween. The compression fittings 176a, 176b are preferably hydraulic-type fittings that maintain a high pressure connection between the reinforcing hose 174 and the housings to limit leakage of the gas.

As is also shown in FIG. 2, a sheath 180 is formed about the reinforcing fibers 174. The sheath 180 also extends around the reinforcing fibers 174 and the compression fittings 176a, 176b of the check valve assembly 125 and the receiving tube 156 of the control valve body 122. The sheath 180 is preferably formed of a non-conductive material such as polyolefin or PVC and is provided to increase the current path length that a stray current would have to travel from the electrified torch head 110 and the control valve assembly 130 that may be in contact with the diver. This also reduces electrolysis to the torch components.

Figure 3B:
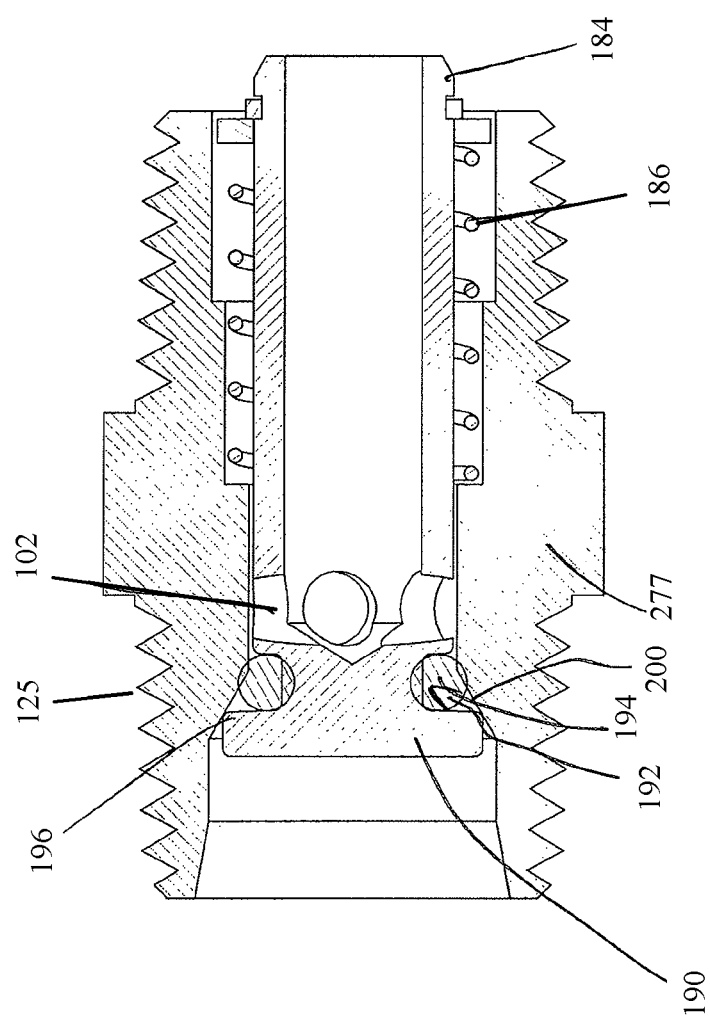

Referring now to FIGS. 1, 2 and 3B, the check valve assembly 125 will now be described. The check valve assembly 125 includes the check valve body 126 that has the receiving tube 170 that receives the gas from the coupler 124. The check valve body 126 also defines a cavity 182 that receives a check valve piston 184. The check valve assembly 125 includes a spring 186 that biases the check valve piston 184 into a closed position. However, the pressure of the gas is sufficient to cause the check valve 184 to be in an open position allowing the gas to be introduced into the torch head 110. Alternatively, if there is blow back, or back pressure in the torch head 110, the back pressure preferably induces the check valve piston 184 into the closed position such that flammable materials are inhibited from being introduced into the coupler 124 or the control valve assembly 125 thereby reducing the risk of combustion within the torch 100.

Figure 3C:
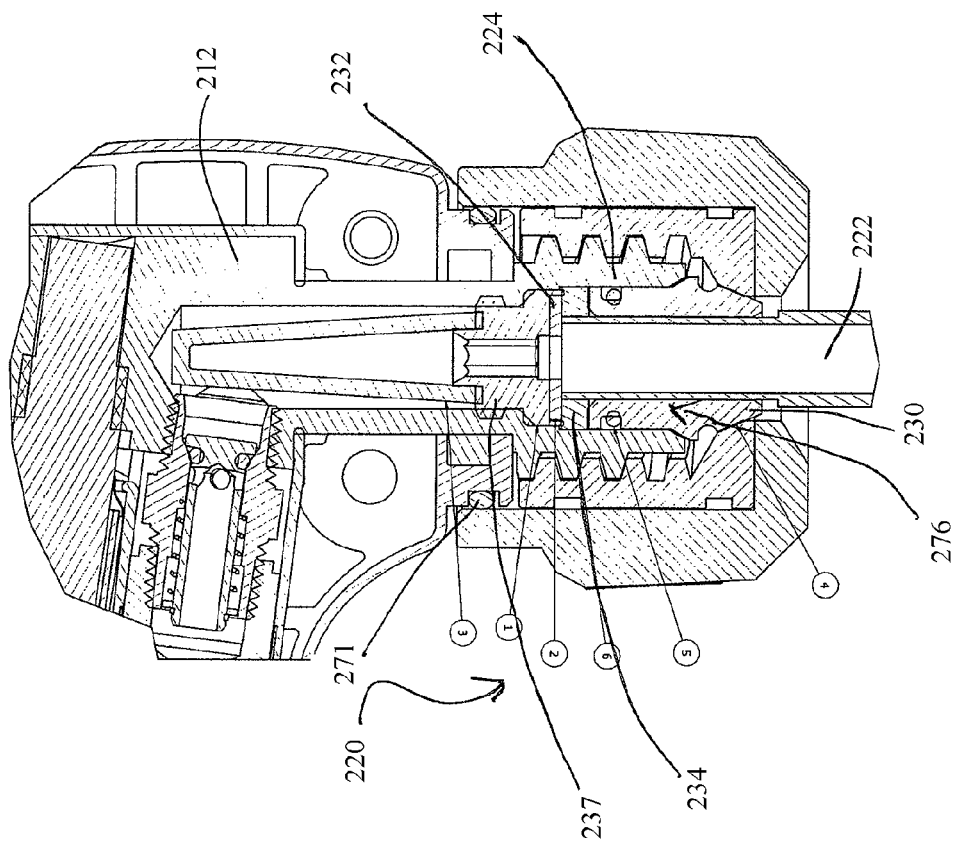

An outer end 190 of the check valve piston 184 includes an annular depression 192 that receives a seal or O-ring 194 that is also preferably made of a substantially non-combustible material to seal the torch head 110 from the coupler 124. In one embodiment, the seal 194 is made of PTFE material for the same reasons as described above. Further, as is shown in FIG. 3C, an outer end 196 of the check valve piston 184 is also contoured to make contact with angled inner surfaces 200 of the check valve body 126 so that even if the seal 194 is compromised, there is still some sealing by the check valve piston 184 in the same manner as described above in conjunction with the control valve piston 132.

The torch head 110 includes a torch head body 212 that has a central cavity 214. The check valve piston 184 controls the flow of gas into the central cavity 214. Inside the central cavity 214 is a sintered element 216 that inhibits the entry of particulates, including combusting particulates into the check valve body 126. In this implementation, the sintered element 216 comprises a screen material and extends substantially the entire length of the central cavity 214.

At the bottom of the cavity 214 and the sintered element 216 there is an opening in the torch head body 212 that is coupled with a collet assembly 220 that is designed to retain a fuel rod, such as a cutting rod 222 in proximity to the torch head 110 to permit ignition of the cutting rod 222 by the current provided to the torch head 110 by the wire 104 and the gas provided by the gas pathway 114.

The torch head body 212 includes a threaded end 224 that has a central aperture 226. A brass collet nut insert 230 is positioned within the central aperture 226 so as to retain the rod 222 in the torch. There is also a ceramic washer 232 that is positioned within the central aperture 226 and provides a surface upon which the end of the cutting rod 222 rests. The use of a ceramic washer 232 as opposed to a rubber washer reduces the risk of the end of the cutting rod damaging the washer. The ceramic washer 232 also provides a degree of electrical isolation between the rod 222 and the housing 102 of the torch 100 and also provides a degree of flash arresting protecting the torch.

A collet sealing washer 234, which can be a silicone rubber or neoprene washer, is then positioned adjacent the ceramic washer 232 so as to be positioned about the outer side of the rod 222 which seals the rod 222 thereby preventing oxidizing gas from leaking into the torch handle. Since the sealing washer 234 is outside of the gas flow it is better protected against ignition.

The collet assembly 220 also includes a flash arrestor nut 257 that is preferably made of brass. The ceramic washer 232 is captured in this nut and the sintered element 216 is attached to this nut so that these components can be replaced by replacing this nut. A gasket 271 is also between the collet nut 224 and the torch head 110.

A further feature that adds to the security of the design is shown in FIGS. 1 and 2. As discussed above, the housing 102 is divided into two separate pieces 102a, 102b. The housing is comprised of a plastic outer sheath 250 with molded rubber inserts 252. The plastic outer sheath 250 and the molded rubber inserts 252 preferably define cavities that receive the wire 104 and the components of the torch 100. Preferably, each of the outer surfaces of the molded rubber inserts 252 and the plastic sheath 250 are positioned in contact with each other and are secured via fasteners 254.

As shown in FIG. 2, one of the molded rubber inserts 252 at the region immediately adjacent the check valve assembly 125 and the torch head 110 has a raised gasket 254. When the two halves 102a, 102b of the housing are positioned together, this raised gasket 254 is compressed which enhances the gas tight seal between the torch head 110 and the interior of the torch 100 which reduces the tendency of combusting gases to travel into the interior of the torch and ignite the torch.

Although the foregoing description of the present invention has shown, illustrated and described one embodiment of the present invention, it will be apparent that various changes to the form and use of the present invention can be made by those skilled in the art without departing from the spirit and scope of the present invention. Hence, the present invention should not be limited to the foregoing discussion but should be defined by the appended claims.

What is claimed is:

1. An underwater torch comprising:
   a housing that has a handle and a nozzle, wherein the interior of the housing defines a passageway for gasses to flow;
   a valve lever attached to the housing having a first position and a second position;
   a control valve coupled to the valve lever wherein the control valve is opened when the valve lever is in the first position allowing gasses to flow through a passageway in the housing and wherein gasses are inhibited from flowing when the lever is in a second position;
   a non-return valve coupled to the housing having an open position wherein gas flows through the non-return valve and closed position so as to inhibit flow of hot gasses from passing through the nozzle end into the torch in the event of a flash back and
   a non-conductive coupler, separate from the housing and positioned within the housing interposed between the control valve and the non-return valve, wherein the coupler is formed of a substantially non-combustible material and forms a passageway whereby gas is provided to the torch head via the control valve and the check valve wherein the non-conductive coupler electrically isolates the control valve and the valve lever from the torch head that receives electrical current from a wire.

2. The torch of claim 1, wherein the housing includes a torch head that is attached to the torch housing and wherein the torch head includes a collet that receives a cutting rod and wherein a flexible washer is positioned adjacent to the collet to seal the cutting rod.

3. The torch of claim 2, wherein the flexible washer comprises an o-ring.

4. The torch of claim 3, wherein the housing defines a passageway for the gasses and wherein the torch head is attached to the housing so that the passageway is sealed about the outer perimeter of the passageway to thereby remove gaskets from access to the oxygen passageway.

5. The torch of claim 3, wherein the passageway defines a large area sintered element slag arrestor adjacent to the collet.

6. The torch of claim 3, wherein a washer that is formed of ceramic is positioned between the collet and the sintered element.

7. The torch of claim 1, wherein the valve lever allows manual return in the event that the valve stem gets stuck.

8. The torch of claim 1, wherein at least a portion of the passageway is lined with a PTFE lined fiberglass reinforcing fiber.

9. The torch of claim 1, wherein the valve lever is coupled to the control valve such that the valve lever moves the valve into both the first position and the second position.

10. The torch of claim 1, wherein the control valve includes a piston and a control valve body that defines an opening that receives the piston and wherein the piston includes a seal formed of a substantially non-combustible material.

11. The torch of claim 10, wherein the piston includes a upper portion and wherein the opening of the control valve body are contoured such that the upper portion of the piston contacts surfaces of the opening of the control valve body in the absence of the seal to inhibit the flow of gas through the control valve.

12. The torch of claim 11, wherein the control valve body includes a seal that is positioned within the interior of the control valve body.

13. The torch of claim 10, wherein the piston is biased into a closed position by a spring.

14. The torch of claim 1, wherein the non-return valve is biased in the closed position by a spring.

15. The torch of claim 1, wherein the non-return valve includes a piston and a non-return valve body that defines an opening that receives the piston and wherein the piston includes a seal formed of a substantially non-combustible material.

16. The torch of claim 15, wherein the piston includes an outer portion and wherein the opening of the non-return valve body are contoured such that the outer portion of the piston contacts surfaces of the opening of the non-return valve body in the absence of the seal to inhibit the flow of gas through the non-return valve.

17. The torch of claim 1, wherein the housing is comprised of two parts that are coupled together via fasteners and wherein the two parts include facing surfaces that contact each other and wherein at least one of the two parts has a raised gasket surface surrounding the non-return valve that is compressed when the two parts are connected together to inhibit gas leaks.

18. An underwater torch comprising:
   a housing that has a handle and a nozzle wherein the interior of the housing defines a passageway for gasses to flow and an electrical passageway through the handle;
   a wire positioned within the electrical passageway;
   a torch head positioned within the housing that receives the wire and the gasses delivered via the gas flow and electrical passageway and produces an arc that, in the presence of gas, ignites a fuel rod;
   a check valve assembly positioned within the housing having an open position wherein gas flows through the check valve and closed position that inhibits the flow of gas or combustions back into the handle portion of the housing from the torch head;
   a control valve assembly having a lever wherein the control valve assembly allows gas to flow to the torch head in a first position and inhibits gas from flowing in a second position; and
   a non-conductive coupler, separate from the housing and positioned within the housing interposed between the control valve assembly and the check valve assembly, wherein the coupler is formed of a substantially non-combustible material and forms a passageway whereby gas is provided to the torch head via the control valve assembly and the check valve assembly wherein the non-conductive coupler electrically isolates the control valve assembly and the lever from the torch head that receives electrical current from a wire.

19. The torch of claim 18, wherein the torch head includes a collet that receives a cutting rod and wherein a flexible washer is positioned adjacent to the collet to seal the cutting rod.

20. The torch of claim 19, wherein the flexible washer comprises an o-ring.

21. The torch of claim 20, wherein the housing defines a passageway for the gasses and wherein the torch head is attached to the housing so that the passageway is sealed about the outer perimeter of the passageway to thereby remove gaskets from access to the oxygen passageway.

22. The torch of claim 21, wherein the passageway defines a large area sintered element slag arrestor adjacent to the collet.

23. The torch of claim 22, wherein a washer that is formed of ceramic is positioned between the collet and the sintered element.

24. The torch of claim 18, wherein the control valve lever is coupled to the control valve assembly such that the valve lever moves the valve into both the first position and the second position.

25. The torch of claim 18, wherein the control valve assembly includes a piston and a control valve body that defines an opening that receives the piston and wherein the piston includes a seal formed of a substantially non-combustible material.

26. The torch of claim 25, wherein the piston includes a upper portion and wherein the opening of the control valve body are contoured such that the upper portion of the piston contacts surfaces of the opening of the control valve body in the absence of the seal to inhibit the flow of gas through the control valve.

27. The torch of claim 26, wherein the control valve body includes a seal that is positioned within the interior of the control valve body.

28. The torch of claim 25, wherein the piston is biased into a closed position by a spring.

29. The torch of claim 18, wherein the check valve is biased in the closed position by a spring.

30. The torch of claim 18, wherein check valve includes a piston and a check valve body that defines an opening that receives the piston and wherein the piston includes a seal formed of a substantially non-combustible material.

31. The torch of claim 30, wherein the piston includes an outer portion and wherein the opening of the check valve body are contoured such that the outer portion of the piston contacts surfaces of the opening of the check valve body in the absence of the seal to inhibit the flow of gas through the check valve.

32. The torch of claim 18, wherein the housing is comprised of two parts that are coupled together via fasteners and wherein the two parts include facing surfaces that contact each other and wherein at least one of the two parts has a raised gasket surface surrounding the check valve that is compressed when the two parts are connected together to inhibit gas leaks.

33. The torch of claim 18, wherein the coupler is formed of a PTFE layer.

34. The torch of claim 33, wherein the PTFE layer is positioned inside of a reinforcing layer.

35. The torch of claim 34, wherein the reinforcing layer comprises fiberglass fiber.

36. The torch of claim 34, wherein a sheath is formed about the reinforcing layer to inhibit current leakage from the check valve assembly to the control valve assembly.

* * * * *